US010585393B2

United States Patent
Kim et al.

(10) Patent No.: US 10,585,393 B2
(45) Date of Patent: Mar. 10, 2020

(54) APPARATUS FOR HOLOGRAPHIC DISPLAY

(71) Applicant: Electronics and Telecommunications Research Institute, Daejeon (KR)

(72) Inventors: Tae One Kim, Daejeon (KR); Hyun Eui Kim, Cheongju-si (KR); Hyon Gon Choo, Daejeon (KR); Jin Woong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 399 days.

(21) Appl. No.: 15/236,956

(22) Filed: Aug. 15, 2016

(65) Prior Publication Data

US 2017/0060088 A1  Mar. 2, 2017

(30) Foreign Application Priority Data

Aug. 28, 2015 (KR) .................. 10-2015-0122014

(51) Int. Cl.
*G03H 1/12* (2006.01)
*G03H 1/04* (2006.01)
(Continued)

(52) U.S. Cl.
CPC ....... *G03H 1/0486* (2013.01); *G02B 27/2264* (2013.01); *G02B 27/2285* (2013.01);
(Continued)

(58) Field of Classification Search
CPC ...... G03H 1/12; G03H 1/2294; G03H 1/2286; G03H 2001/2242; G03H 2227/03;
(Continued)

(56) References Cited

U.S. PATENT DOCUMENTS 4,317,610 A * 3/1982 Breglia .................. G09B 9/305
359/15
5,777,760 A * 7/1998 Hays ........................ G03H 1/28
359/7
(Continued)

FOREIGN PATENT DOCUMENTS

KR   10-2009-0039310 A   4/2009

OTHER PUBLICATIONS

Jones, Andrew, et al., "Rendering for an interactive 360 light field display." *ACM Transactions on Graphics (TOG)*. vol. 26. No. 3. ACM, 2007. (10 pages, in English).

*Primary Examiner* — William R Alexander
*Assistant Examiner* — Balram T Parbadia
(74) *Attorney, Agent, or Firm* — NSIP Law

(57) ABSTRACT

Provided is a holographic display apparatus including a motor configured to synchronize with a hologram transmitted based on user's point of view and to rotate; a spatial light modulator configured to load hologram data generated based on the user's point of view in a fixed position state and to perform a light modulation; a mirror configured to provide the hologram which is light-modulated by the spatial light modulator according to the user's point of view during the rotation by rotation operation of the motor; and a hologram correction unit configured to compensate a rotation error between the fixed spatial light modulator and the rotating mirror and to provide a corrected hologram data to the spatial light modulator.

6 Claims, 8 Drawing Sheets

(51) Int. Cl.
*G03H 1/22* (2006.01)
*G02B 27/22* (2018.01)
*G03H 1/08* (2006.01)

(52) U.S. Cl.
CPC ......... *G03H 1/0808* (2013.01); *G03H 1/2205* (2013.01); *G03H 1/2294* (2013.01); *G03H 2001/2242* (2013.01); *G03H 2210/30* (2013.01); *G03H 2227/03* (2013.01)

(58) Field of Classification Search
CPC ....... G03H 2001/2236; G03H 2210/30; G03H 2226/05; G03H 1/0005; G03H 1/0866; G03H 2001/0038; G03H 2223/24; G03H 1/2202; H04N 13/366; H04N 13/368; H04N 13/383; H04N 13/373; H04N 13/376; H04N 13/38; G02B 27/0093; G06F 3/011; G06F 3/013; G06F 3/017; G06F 3/0304; G06F 3/0346; G06F 3/04815
See application file for complete search history.

(56) References Cited

U.S. PATENT DOCUMENTS

| | | | | |
|---|---|---|---|---|
| 6,334,699 | B1* | 1/2002 | Gladnick | F21V 7/00 362/268 |
| 6,809,307 | B2* | 10/2004 | Byren | F41H 13/0043 250/201.9 |
| 6,816,291 | B2* | 11/2004 | Tanaka | G03H 1/0248 359/22 |
| 8,500,284 | B2 | 8/2013 | Rotschild et al. | |
| 2003/0062468 | A1* | 4/2003 | Byren | F41H 13/0043 250/216 |
| 2009/0141120 | A1* | 6/2009 | Kang | G11B 7/0065 348/40 |
| 2011/0128555 | A1* | 6/2011 | Rotschild | G02B 27/2271 356/625 |
| 2014/0192146 | A1 | 7/2014 | Park et al. | |
| 2014/0327748 | A1 | 11/2014 | Debevee et al. | |
| 2015/0085331 | A1 | 3/2015 | Chae | |

* cited by examiner (a)  (b)

APPARATUS FOR HOLOGRAPHIC DISPLAY

CROSS-REFERENCE TO RELATED APPLICATION

This application claims the benefit of priority to Korean Patent Application No. 10-2015-0122014, filed on Aug. 28, 2015 in the Korean Intellectual Property Office, the disclosure of which is incorporated herein in its entirety by reference.

BACKGROUND OF THE INVENTION

Field of the Invention

The present disclosure relates to an apparatus for holographic display.

Description of the Related Art

Recently, an interest in a display of a tabletop type that enables to look an object or a scene to be watched at all directions is increased. Such a display of tabletop type performs spatial tiling of a plurality of spatial light modulator (SLM) panels in all directions to enable to watch a hologram from various angles, thereby increasing utility of the display.

However, a limitation in space exists due to a SLM panel size when performing the spatial tiling of a plurality of SLM panels, and a volume of the display may be increased. Further, cost may be increased by using a plurality of SLM panels.

SUMMARY OF THE INVENTION

The present disclosure has been made in view of the above problems, and provides a holographic display apparatus that can implement a hologram display of 360-degree direction by using a single spatial light modulator (SLM) which is separated from a motor and is fixed without being rotated and using a rotating optical system (mirror), and compensate distortion caused by a rotation of hologram with software.

In accordance with an aspect of the present disclosure, a holographic display apparatus includes: a motor configured to synchronize with a hologram transmitted based on user's point of view and to rotate; a spatial light modulator configured to load hologram data generated based on the user's point of view in a fixed position state and to perform a light modulation; a mirror configured to provide the hologram which is light-modulated by the spatial light modulator according to the user's point of view during the rotation by rotation operation of the motor; and a hologram correction unit configured to compensate a rotation error between the fixed spatial light modulator and the rotating mirror and to provide a corrected hologram data to the spatial light modulator. The spatial light modulator is separate from the motor or a rotation shaft of the motor. One side of the mirror is fixed to a rotation shaft of the motor. The mirror is fixed to a rotation shaft of the motor by a fixing means. When correcting a three-dimensional object in a form of computer graphic (CG), the hologram correction unit rotates the three-dimensional object based on an optical axis proceeding in a direction perpendicular to a plane of the spatial light modulator by a rotation angle of the motor, and calculates the rotated three-dimensional object as hologram to provide the corrected hologram data. When correcting a hologram data corresponding to a different user's point of view in a 360-degree direction, the hologram correction unit rotates a hologram image of the hologram data in a horizontal direction of a plane of the spatial light modulator by a rotation angle of the motor and provides the corrected hologram data. The spatial light modulator loads the corrected hologram data to perform a light modulation. The spatial light modulator includes an effective area for loading a hologram image of the hologram data, and the hologram correction unit sets data value of the hologram image loaded in an area excluding the effective area among hologram data loaded by the spatial light modulator to zero. The effective area is implemented in a form of an inscribed circle having a diameter which is a horizontal side or a vertical side of the spatial light modulator.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
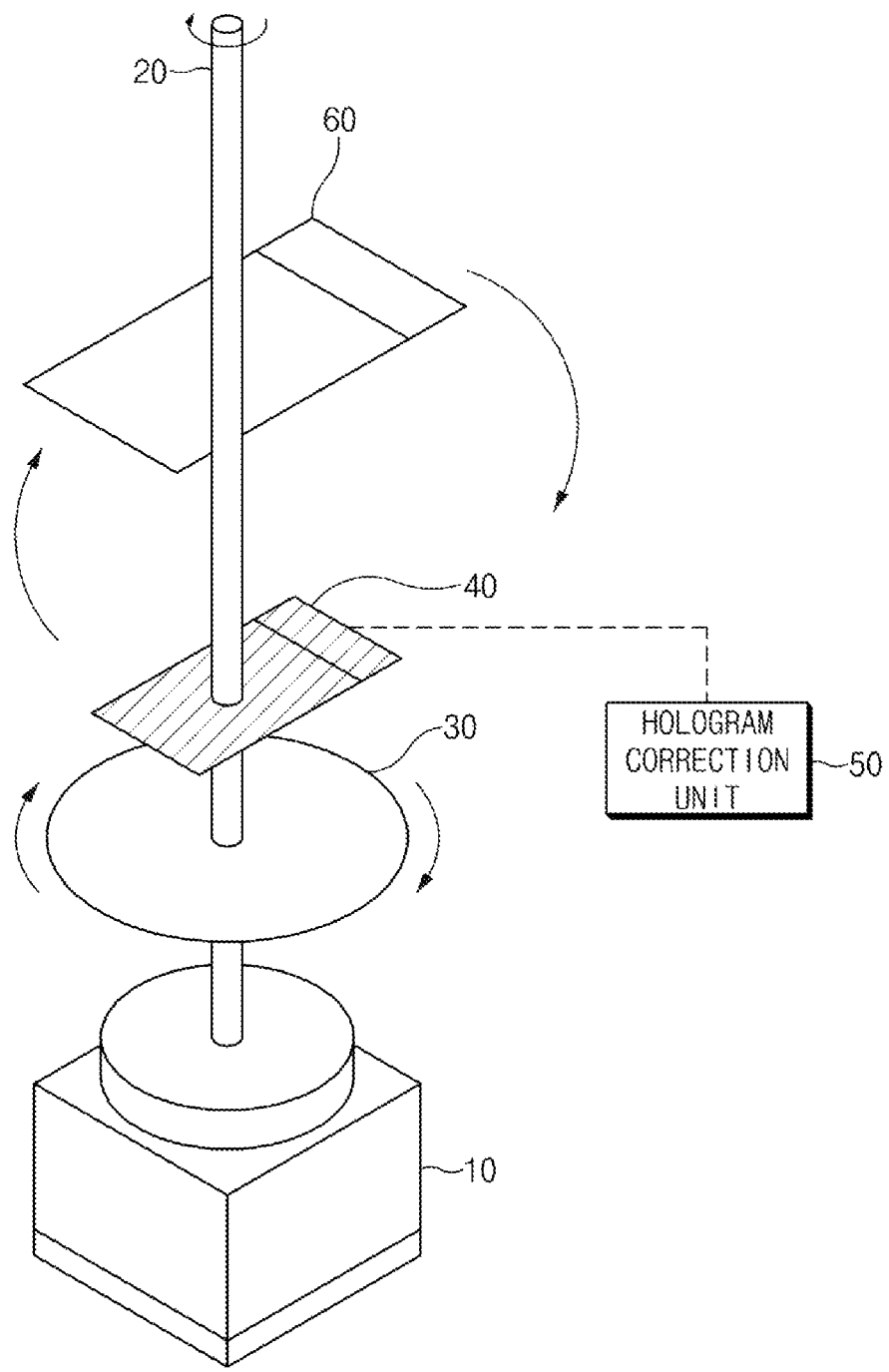
FIG. 1 is a diagram illustrating a configuration of a holographic display apparatus according to the present disclosure.

FIG. 1 is a diagram illustrating a configuration of a holographic display apparatus according to the present disclosure.

Referring to FIG. 1, the holographic display apparatus according to the present disclosure may include a motor 10, a spatial light modulator (SLM) driving board 30, a spatial light modulator (SLM) 40, a hologram correction unit 50, and a mirror 60.

The motor 10 may be an apparatus for applying a force to a rotation shaft 20 to rotate 360 degrees in a constant speed, and, in the present disclosure, the motor 10 may serve to rotate the mirror 60. The motor 10 may be synchronized with a hologram which is transmitted based on user's point of view to rotate. At this time, rotation of the motor 10 may be controlled by a separate controller (not shown).

The SLM driving board 30 may serve to drive the SLM 40, and may transmit a hologram data generated based on user's point of view to the SLM 40.

The SLM 40 may perform a light modulation by loading the hologram data transmitted from the SLM driving board 30. The SLM 40 may perform the light modulation of the hologram data in response to a control signal of the controller. At this time, the SLM 40 may transmit the light modulated hologram to the rotating mirror 60.

Here, the SLM 40 may operate in a state of being separated from the rotation shaft 20 of the motor 10, while being fixed in a certain position. For example, the SLM 40 may be fixed in a certain position by a separate fixing means (not shown). In this case, the method of fixing the position of the SLM 40 is not limited to any specific method, but, obviously, various methods may be applied depending on an embodiment.

The mirror 60 may be an optical system for the rotation and the transmission of the hologram, and may be rotated by the rotation of the motor 10.

For example, one side of the mirror 60 may be fixed to the rotation shaft 20 of the motor 10. As another example, the mirror 60 may be fixed to the rotation shaft 20 of the motor 10 by a separate fixing means. At this time, if the rotation shaft 20 of the motor 10 is rotated, the mirror 60 also is rotated by the fixed rotation shaft 20. Thus, the mirror 60 may transmit the hologram corresponding to the user's point of view while rotating 360 degrees. Obviously, the method of fixing the mirror 60 to the motor 10 is not limited to any specific method, but the mirror 60 may be fixed in various forms.

Embodiments of the operation of transmitting the hologram corresponding to the user's point of view are described with reference to FIG. 2A to FIG. 2C.

Figure 2A:
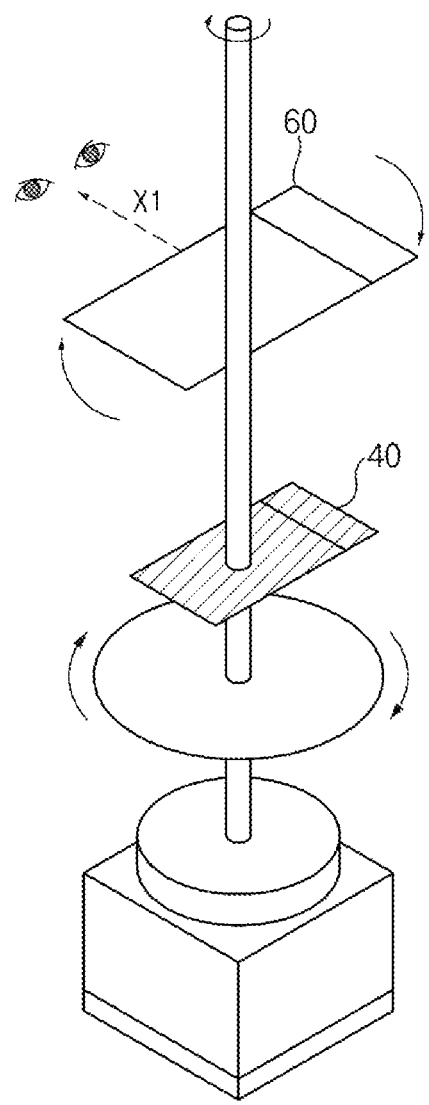
FIG. 2A to FIG. 2C are a diagram illustrating an embodiment of an operation of a holographic display apparatus according to the present disclosure.

FIG. 2A illustrates an embodiment in the case where user's point of view is X1. As shown in FIG. 2A, if the user's point of view is X1, the time of hologram data generation and the time of motor rotation may be synchronized with each other based on the user's point of view X1. Thus, the SLM 40 may perform a light modulation by loading the hologram data generated based on the point of view X1, and the motor 10 may transmit the light modulated hologram to a user according to the point of view X1.

Figure 2B:
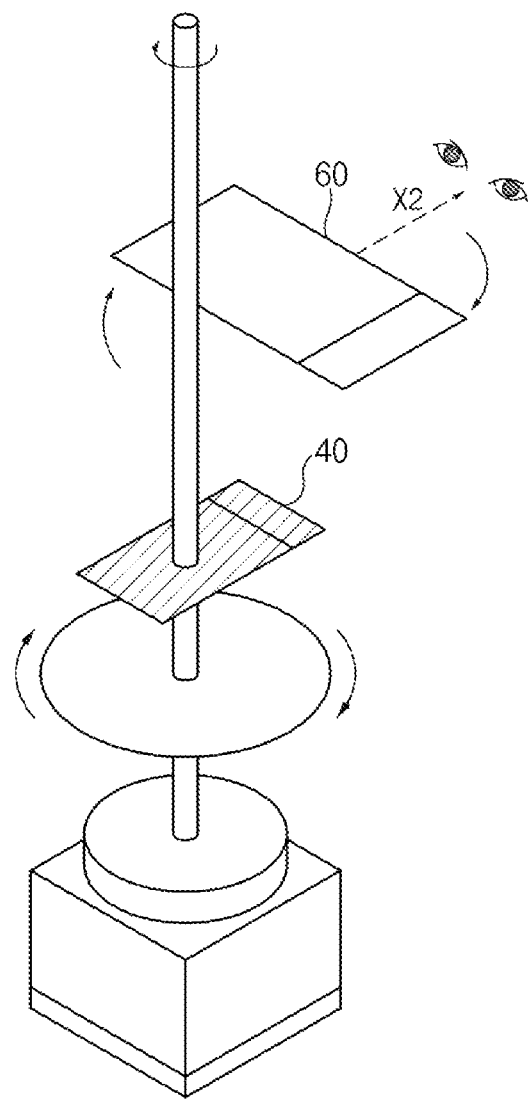

FIG. 2B illustrates an embodiment in the case where user's point of view is X2. As shown in FIG. 2B, if the user's point of view is X2, the time of hologram data generation and the time of motor rotation may be synchronized with each other based on the user's point of view X2. Thus, the SLM 40 may perform a light modulation by loading the hologram data generated based on the point of view X2, and the motor 10 may transmit the light modulated hologram to a user according to the point of view X2.

Figure 2C:
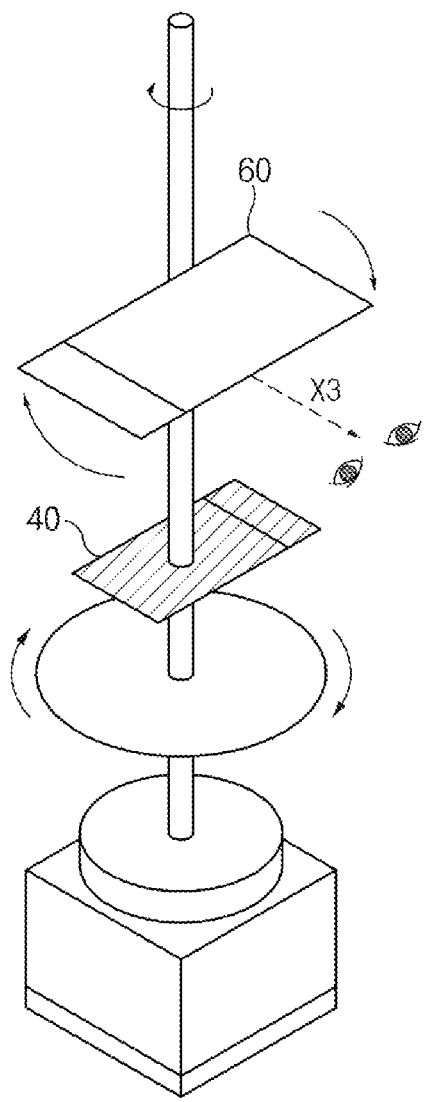

FIG. 2C illustrates an embodiment in the case where user's point of view is X3. As shown in FIG. 2C, if the user's point of view is X3, the time of hologram data generation and the time of motor rotation may be synchronized with each other based on the user's point of view X3. Thus, the SLM 40 may perform a light modulation by loading the hologram data generated based on the point of view X3, and the motor 10 may transmit the light modulated hologram to a user according to the point of view X3.

Obviously, if a plurality of the user's point of views exist, the hologram data generated in response to each point of view may be synchronized with the rotation time of the motor 10, and a hologram may be provided according to each point of view through the SLM 40 and the rotating mirror 60.

The hologram correction unit 50 may serve to provide a corrected hologram data by compensating a rotation error between the SLM 40 fixed in a certain position and the rotating mirror 60.

In other words, the SLM 40 may transmit the hologram data to the mirror 60 while a position is fixed, and the mirror 60 may transmit hologram while rotating 360 degrees by the motor 10 so that error may occur in the transmitted hologram. In this case, the hologram transmitted by the mirror 60 may be viewed as if it rotates.

To this end, the hologram correction unit 50 may correct the hologram data loaded from the physically fixed SLM 40 as much as the mirror 60 rotates to have an effect similar to the rotation of the SLM 40.

In this case, the hologram correction unit 50 may correct the hologram data through a rotation correction algorithm.

When using a fixed position SLM 40, the hologram may be calculated on the assumption of below three cases.

Case 1. The case of having 3-dimensional object in the form of computer graphic (CG).

Case 2. The case in which a hologram data corresponding to a different point of view in all directions is already stored by a computer generated hologram (CGH) method, that is, the case of having a hologram data corresponding to the rotating SLM 360.

Case 3. The case in which a hologram data corresponding to a different point of view in all directions is obtained on-line by a multi-viewpoint hologram direct acquisition camera arrangement, or is already obtained and stored in off-line.

In the case of Case 1, the hologram calculation method loaded in the fixed position SLM 40 is as follows.

Figure 3:
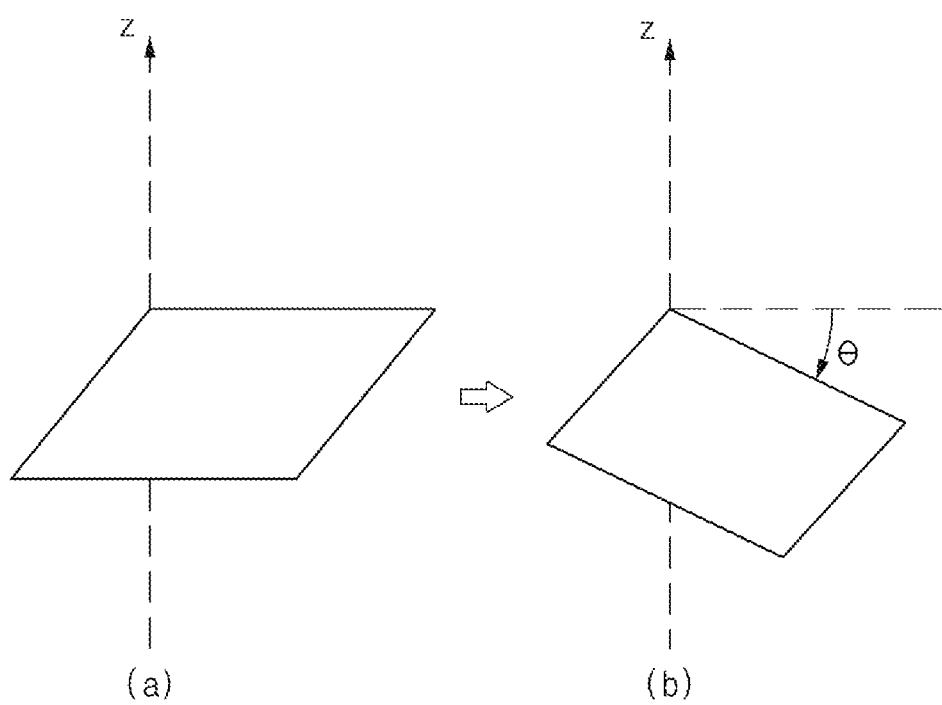
FIG. 3 to FIG. 5 are a diagram illustrating a correction operation of a holographic display apparatus according to the present disclosure.

When the rotation angle of the motor 10 is θ, the hologram correction unit 50 may rotate the three-dimensional object by −θ based on z axis which is an optical axis that proceeds in a direction perpendicular to a plane of the SLM 40, and may provide a corrected hologram data by calculating the rotated three-dimensional object as hologram. FIG. 3 illustrates this embodiment.

Case 2 and Case 3 represent different situations, but the obtained hologram data are the same, so that hologram can be calculated in the same method. In Case 2 and Case 3, the hologram calculation method loaded in the fixed position SLM 40 is as follows.

Figure 4:
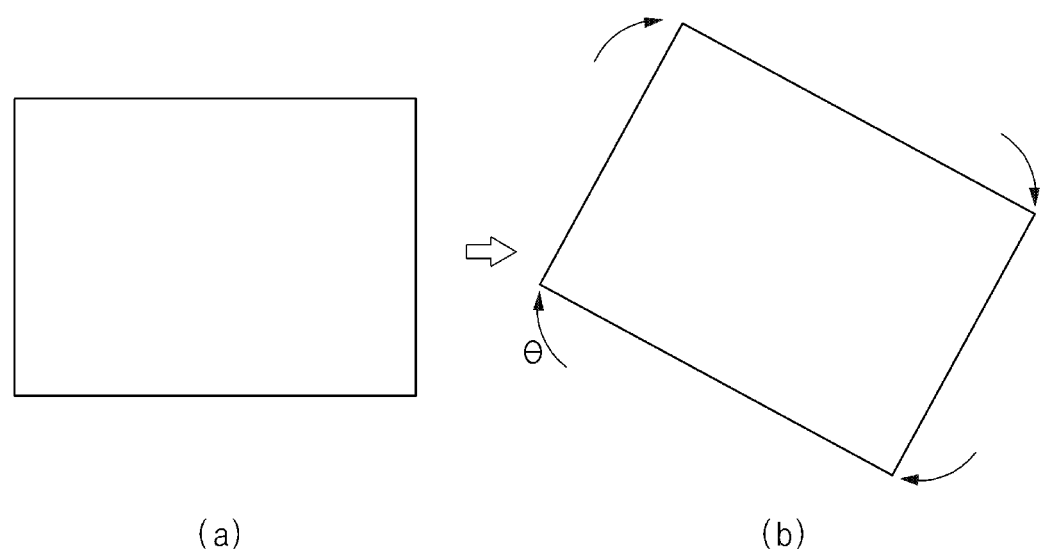

When having only the hologram data for two-dimensional hologram, the hologram correction unit 50 may rotate the hologram by a rotation angle −θ of motor 10 in a horizontal direction so that it is possible to provide a corrected hologram data. FIG. 4 illustrates this embodiment.

Thus, when using the above hologram correction method, the SLM 40 may load the hologram data corrected by the hologram correction unit 50 to perform a light modulation and then transmit to the mirror 60, so that the mirror 60 can provide a rotation compensated hologram.

Meanwhile, the hologram data generated by an algorithm applied to the above three cases does not use data of all areas loaded to the SLM 40, but only uses data corresponding to an effective area. That is, the SLM 40 is used only for an effective area that loads the hologram image of hologram data.

Figure 5:
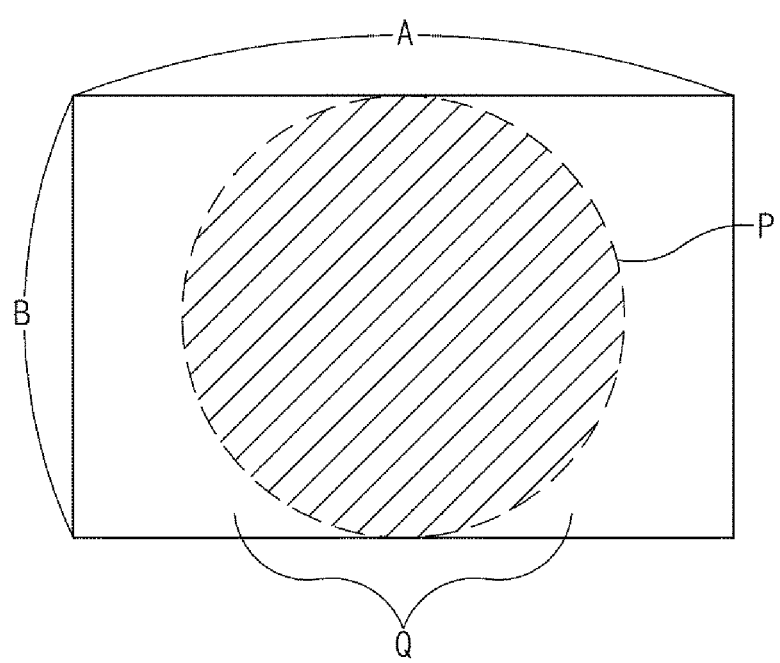

At this time, when the hologram data corrected by the SLM 40 is loaded, if a hologram image loaded in an area excluding the effective area of the SLM 40 exists among the corrected hologram data, the hologram correction unit 50 may set data value of the hologram image loaded in an area excluding the effective area of the SLM 40 to zero so that it is possible to correct the distortion of the hologram. FIG. 5 illustrates this embodiment.

Referring to FIG. 5, FIG. 5 shows the area of the SLM 40. P area denotes an effective area of the SLM 40, and Q area denotes an area excluding the effective area of the SLM 40. In addition, A denotes a horizontal side of the SLM 40, and B denotes a vertical side of the SLM 40.

The effective area P of the SLM 40 may be a maximum circle inscribed in the border of the SLM 40. For example, in FIG. 5, the effective area P of the SLM 40 may be an inscribed circle having a diameter B. Obviously, in the case of A<B, the effective area P of the SLM 40 may be an inscribed circle of diameter A.

In the case of the effective area information of Case 1, the computer generated hologram (CGH) may be performed only within the effective area during the calculation of the hologram data for three-dimensional object so that the calculation time may be effectively reduced.

The controller according to the present embodiment may correspond to at least one processor, or may include at least one processor. Accordingly, the controller may be driven in a form of being included in other hardware device such as a microprocessor or a computing system.

Figure 6:
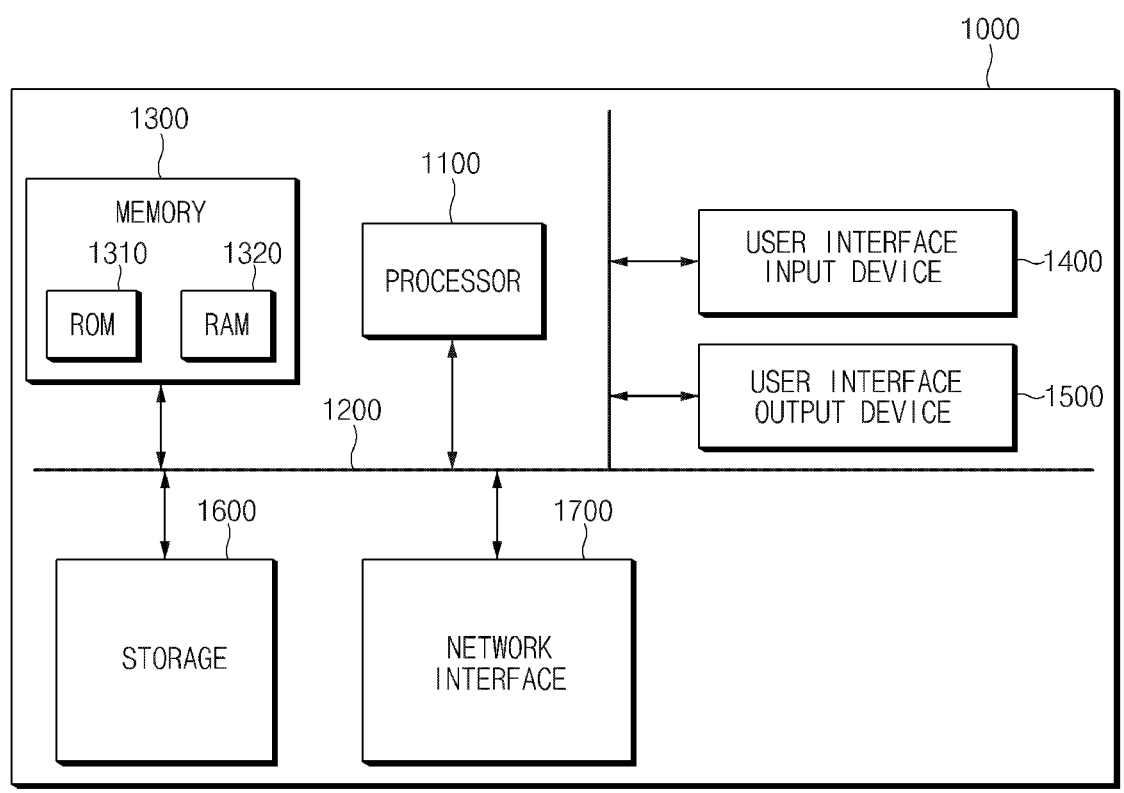
FIG. 6 is a block diagram illustrating a computing system implementing the apparatus according to the present disclosure.

FIG. 6 is a diagram illustrating a computing system implementing the apparatus according to the present disclosure.

Referring to FIG. 6, a computing system 1000 may include at least one processor 1100 which is connected via a bus 1200, memory 1300, an user interface input device 1400, an user interface output device 1500, a storage 1600, and a network interface 1700.

The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) and a Random Access Memory (RAM).

Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM. The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

According to the present disclosure, a hologram display of 360-degree direction can be implemented by using a single spatial light modulator (SLM) which is separated from a motor and is fixed in a certain position without being rotated and using a rotating optical system (mirror), and distortion caused by a rotation of hologram can be compensated with software without adding hardware.

Further, according to the present disclosure, cost may be reduced by using a single spatial light modulator (SLM), and a hardware structure of the hologram display may be simplified to minimize a volume.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A holographic display apparatus comprising:
a spatial light modulator (SLM) fixed in a position and configured to load hologram data generated based on a user's point of view and to perform a light modulation;
a mirror configured to rotate by a rotation operation of a motor and to provide a hologram which is light-modulated by the SLM during the rotation operation of the motor; and
a hologram correction unit comprising a processor configured to compensate a rotation error between the fixed SLM and the rotating mirror and to provide a corrected hologram data to the SLM,
wherein the SLM includes an effective area for loading a hologram image of the hologram data, and the hologram correction unit sets data value of the hologram image loaded in an area excluding the effective area among the hologram data loaded by the SLM to zero.

2. The holographic display apparatus of claim 1, wherein the effective area is implemented in a form of an inscribed circle having a diameter which is a horizontal side or a vertical side of the SLM.

3. A holographic display apparatus, comprising:
a spatial light modulator (SLM) fixed in a position, and configured to load hologram data generated based on a user's point of view and to perform a light modulation, the SLM including an effective area for loading a hologram image of the hologram data;
a mirror fixed to a rotation shaft of a motor and configured to provide a hologram which is light-modulated by the SLM according to the user's point of view during a rotation by a rotation operation of the motor; and
a hologram correction unit comprising a processor configured to:
compensate a rotation error between the fixed SLM and the rotating mirror,
provide a corrected hologram data to the SLM, and
set data value of the hologram image loaded in an area excluding the effective area among the hologram data loaded by the SLM to zero.

4. The holographic display apparatus of claim 3, wherein the effective area is implemented in a form of an inscribed circle having a diameter which is a horizontal side or a vertical side of the SLM.

5. The holographic display apparatus of claim 3, wherein the SLM is separated from the rotation shaft of the motor.

6. The holographic display apparatus of claim 3, wherein the mirror is fixed to the rotation shaft of the motor by a fixing means.

* * * * *